(12) United States Patent
Udagawa et al.

(10) Patent No.: US 9,585,468 B2
(45) Date of Patent: Mar. 7, 2017

(54) CORD MANAGEMENT SYSTEM FOR FURNITURE

(71) Applicant: Knoll, Inc., East Greenville, PA (US)

(72) Inventors: Masamichi Udagawa, New York, NY (US); Sigrid Moeslinger, New York, NY (US)

(73) Assignee: Knoll, Inc., East Greenville, PA (US)

( * ) Notice: Subject to any disclaimer, the term of this patent is extended or adjusted under 35 U.S.C. 154(b) by 0 days.

(21) Appl. No.: 14/727,011

(22) Filed: Jun. 1, 2015

(65) Prior Publication Data

US 2015/0351530 A1    Dec. 10, 2015

Related U.S. Application Data

(60) Provisional application No. 62/009,367, filed on Jun. 9, 2014.

(51) Int. Cl.
| | |
|---|---|
| *A47B 37/00* | (2006.01) |
| *A47B 21/06* | (2006.01) |
| *A47B 21/02* | (2006.01) |
| *F16L 3/015* | (2006.01) |
| *F16L 3/23* | (2006.01) |
| *F16L 3/26* | (2006.01) |

(Continued)

(52) U.S. Cl.
CPC .............. *A47B 21/06* (2013.01); *A47B 21/02* (2013.01); *F16L 3/015* (2013.01); *F16L 3/23* (2013.01); *F16L 3/26* (2013.01); *H02G 3/0487* (2013.01); *H02G 11/003* (2013.01); *A47B 2097/003* (2013.01); *H02G 3/32* (2013.01)

(58) Field of Classification Search
CPC ......... A47B 21/06; A47B 21/02; A47B 21/00; A47B 2097/003; A47B 2200/008; F16L 3/015; F16L 3/23; F16L 3/26; H02G 3/0487; H02G 3/32; H02G 11/003
USPC ......... 108/50.02, 50.01; 312/223.6; 174/662, 174/481; 439/207, 210
See application file for complete search history.

(56) References Cited

U.S. PATENT DOCUMENTS 3,266,059 A * 8/1966 Stelle .......................... B25J 9/06
                                                                138/120
3,872,881 A * 3/1975 Miller ....................... E02F 3/65
                                                                137/355.17

(Continued)

*Primary Examiner* — Jose V Chen
(74) *Attorney, Agent, or Firm* — Buchanan Ingersoll & Rooney PC

(57) ABSTRACT

A cord management system for furniture includes an elongated flexible member having a plurality of cable clip elements attached thereto for attachment to multiple cables to retain the cables near the elongated member. The elongated flexible member is resilient and is configured for attachment to an article of furniture, such as a table, that is vertically moveable from a first lowered position to a second raised position. For example, when the article of furniture is in the raised position, the elongated member can be extended to a first position in which the member resembles an "S" shape, a "∫" shape, a "⌐" shape, or a backward "S" shape, e.g. "2" shape and when the article of furniture is in the lowered position, the elongated member can be compressed to a curved compressed configuration that is "", " ⌇ " or " ⌇ " in shape.

20 Claims, 6 Drawing Sheets

(51) Int. Cl.
*H02G 3/04* (2006.01)
*H02G 11/00* (2006.01)
*A47B 97/00* (2006.01)
*H02G 3/32* (2006.01)

(56) References Cited

U.S. PATENT DOCUMENTS

| | | | | |
|---|---|---|---|---|
| 4,129,277 A | * | 12/1978 | Tenniswood | H02G 11/006 191/12 C |
| 4,625,936 A | * | 12/1986 | Hadden, Sr. | B25J 9/06 138/120 |
| 4,762,072 A | * | 8/1988 | Boundy | A47B 21/06 108/50.02 |
| 4,826,112 A | | 5/1989 | Rettler | |
| 5,240,209 A | * | 8/1993 | Kutsch | F16G 13/16 248/49 |
| 5,845,587 A | * | 12/1998 | Ditonto | A47B 21/00 108/147 |
| D404,010 S | | 1/1999 | Viklund et al. | |
| 5,988,076 A | | 11/1999 | Vander Park | |
| 6,133,528 A | | 10/2000 | Henriott et al. | |
| 6,327,139 B1 | * | 12/2001 | Champion | H02B 1/202 174/69 |
| 6,327,983 B1 | * | 12/2001 | Cronk | A47B 21/06 108/50.02 |
| 6,349,655 B1 | * | 2/2002 | Carr | A47B 21/06 108/50.02 |
| 6,360,675 B1 | * | 3/2002 | Jones | A47B 21/06 108/50.02 |
| 6,410,855 B1 | | 6/2002 | Berkowitz et al. | |
| 6,415,723 B1 | * | 7/2002 | Kopish | A47B 3/0815 108/128 |
| 6,435,106 B2 | * | 8/2002 | Funk | A47B 21/06 108/50.02 |
| 6,896,344 B2 | * | 5/2005 | Tsutsumi | H02G 11/006 248/51 |
| 6,960,098 B1 | * | 11/2005 | Tseng | A47B 21/06 108/50.02 |
| 6,970,353 B2 | * | 11/2005 | Brovald | G06F 1/20 165/121 |
| 7,066,097 B2 | * | 6/2006 | Gayhart | A47B 21/06 108/50.02 |
| 7,640,866 B1 | * | 1/2010 | Schermerhorn | A47B 21/00 108/5 |
| 7,717,738 B2 | | 5/2010 | Mabry | |
| 7,817,444 B2 | | 10/2010 | Dennes | |
| 7,871,280 B2 | * | 1/2011 | Henriott | A47B 21/06 108/50.02 |
| 8,297,560 B2 | * | 10/2012 | Hung | F16L 3/015 174/95 |
| 8,405,988 B2 | * | 3/2013 | Wang | H05K 7/20172 361/695 |
| 9,018,527 B2 | * | 4/2015 | Komiya | H02G 3/0406 174/68.3 |
| 9,115,928 B2 | * | 8/2015 | Akalan | F25D 23/028 |

* cited by examiner

CORD MANAGEMENT SYSTEM FOR FURNITURE

CROSS-REFERENCE TO RELATED APPLICATIONS

The present application claims priority to U.S. Provisional Patent Application No. 62/009,367, which was filed on Jun. 9, 2014.

FIELD OF INVENTION

The present invention relates to furniture having a cord management system.

BACKGROUND OF THE INVENTION

Tables and other furniture can be configured to provide a work surface, such as a table top or counter top at a fixed vertical location. But, such a fixed height for a work surface can fail to meet the preferences of different types of works. For instance, shorter workers may prefer a lower work surface while taller workers may prefer a higher work surface.

Cord management for different articles of furniture can also present complications. For example, multiple wires or other types of cords or cables for electronic devices may fail to be collected or organized near a work surface. Such a configuration of loose wires can pose a hazard to workers as they may be messily provided in a way that can entangle feet. Such loose wires can also provide an undesired aesthetic effect for furniture. For instance, the view of such wires can look sloppy or otherwise provide an undesirable aesthetic effect.

SUMMARY OF THE INVENTION

A cord management system for an article of furniture is provided that includes a cord management assembly having a first end, a second end, and a middle portion between the first and second ends. The first end is positionable adjacent to a bottom surface of a structure defining a work surface. The second end is positionable adjacent a base of the article of furniture. The middle portion can extend from the first end to the second end. The middle portion can have at least one cord retention portion attached to at least one flexible elongated segment member. The cord management assembly can be configured such that the cord management assembly is moveable between a curved compressed first position and an extended second position that is less curved than the curved compressed first position.

An article of furniture is also provided. The article of furniture can include a work surface and a base that supports the work surface. The base can be vertically adjustable to raise and lower the work surface between a raised position and a lowered position. The article of furniture can also include a cord management system positioned between the work surface and the base. The cord management system can include a cord management assembly having a first end, a second end, and a middle portion between the first and second ends. The first end can be positioned adjacent a bottom surface of a structure defining the work surface and the second end can be positioned adjacent the base. The middle portion can extend from the first end to the second end. The middle portion can have at least one cord retention portion attached to at least one flexible elongated segment member. The cord management assembly can be configured such that the cord management assembly is in a curved compressed first position when the work surface is in the lowered position and is in an extended second position that is less curved and less compressed than the curved compressed first position when the work surface is in the raised position.

Embodiments of the cord management system can be configured so that the at least one cord retention portion is comprised of a first cord retention portion, a second cord retention portion and a third cord retention portion and the at least one flexible elongated segment member is comprised of a first flexible elongated segment member, a second flexible elongated segment member, a third flexible elongated segment member, and a fourth flexible elongated segment member. The first cord retention portion can be attached to the first end by the first flexible elongated segment member extending between the first end and the first cord retention portion, the second cord retention portion can be attached to the first cord retention portion by the second flexible elongated segment member extending between the first and second cord retention portions, the third cord retention portion can be attached to the second cord retention portion by the third flexible elongated segment member extending between the second and third cord retention portions, and the second end can be attached to the third cord retention portion by the fourth flexible elongated segment member extending between the third cord retention portion and the second end. The first cord retention portion can be spaced apart from the second cord retention portion, the second cord retention portion can be spaced apart from the third cord retention portion, and the third cord retention portion can be spaced apart from the first cord retention portion. In some embodiments, the second cord retention portion is longer than the first cord retention portion and is also longer than the third cord retention portion.

The first, second and third cord retention portions can each be configured to define a channel through which a plurality of cords pass as the cords extend from an outlet to a position adjacent the work surface. Each of the flexible elongated segment members can be configured to bias portions of the cords that are outside of the channels of the cord retention portions such that the cords are biased to have a shape corresponding to a shape of the cord management assembly when the work surface is moved from the lowered position to the raised position.

In some embodiments, the shape of the cord management assembly can be configured so that it has a generally "S" in shape, a "ϒ" shape, a "ʃ" shape, or a "2" shape when the cord management assembly is in the second position and is in a generally "" shape or "⌒→" shape when the cord management assembly is in the first position.

Other details, objects, and advantages of the invention will become apparent as the following description of certain exemplary embodiments thereof and certain exemplary methods of practicing the same proceeds.

BRIEF DESCRIPTION OF THE DRAWINGS

Exemplary embodiments of a cord management system and furniture having such a cord management system are shown in the accompanying drawings and certain exemplary methods of practicing the same are also illustrated therein. It should be appreciated that like reference numbers used in the drawings may identify like components.

DETAILED DESCRIPTION OF EXEMPLARY EMBODIMENTS

Figure 1:
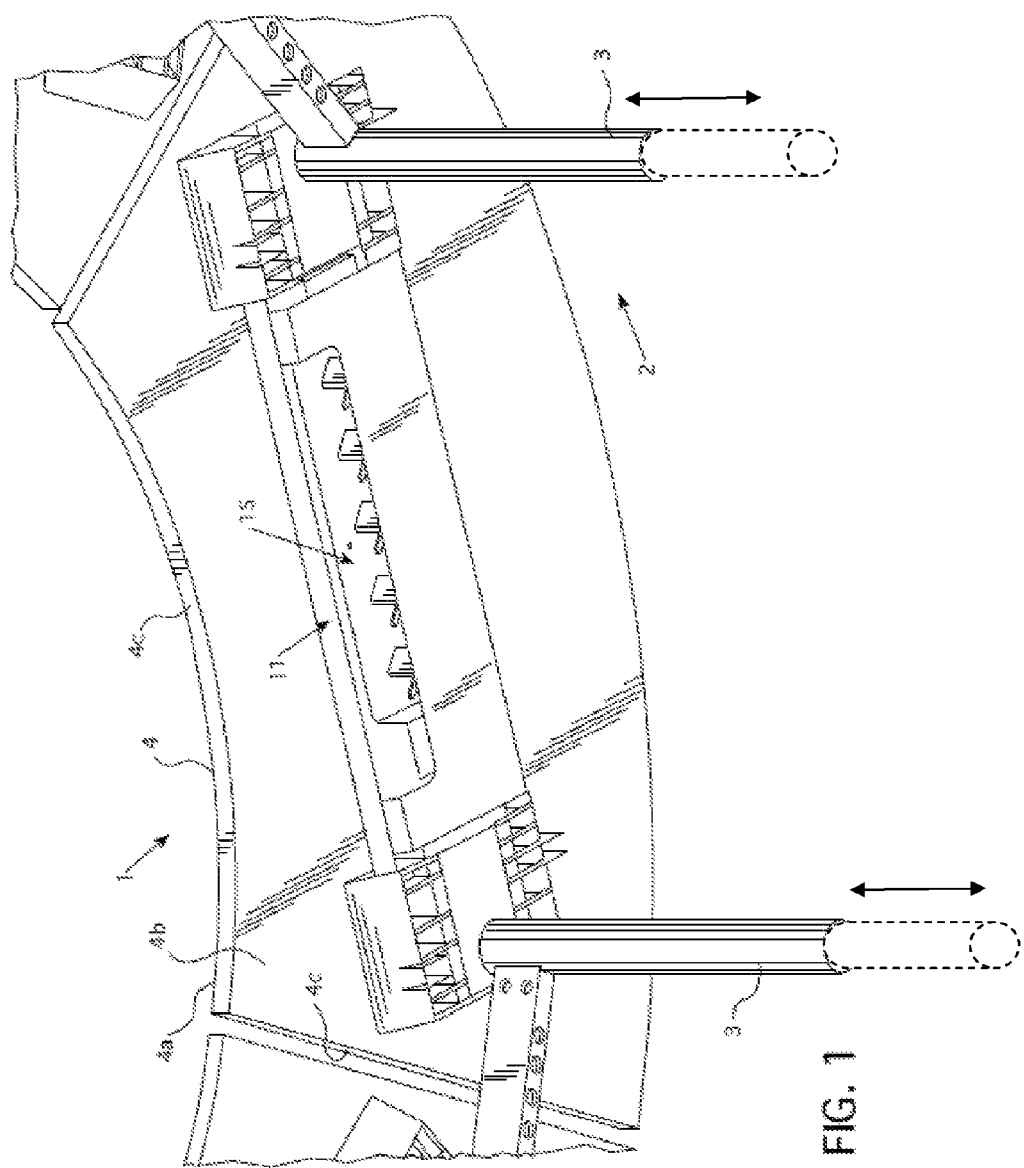
FIG. 1 is a bottom fragmentary perspective view of a first exemplary embodiment of an article of furniture having a portion of a first exemplary embodiment of a cord management system.
Figure 2:
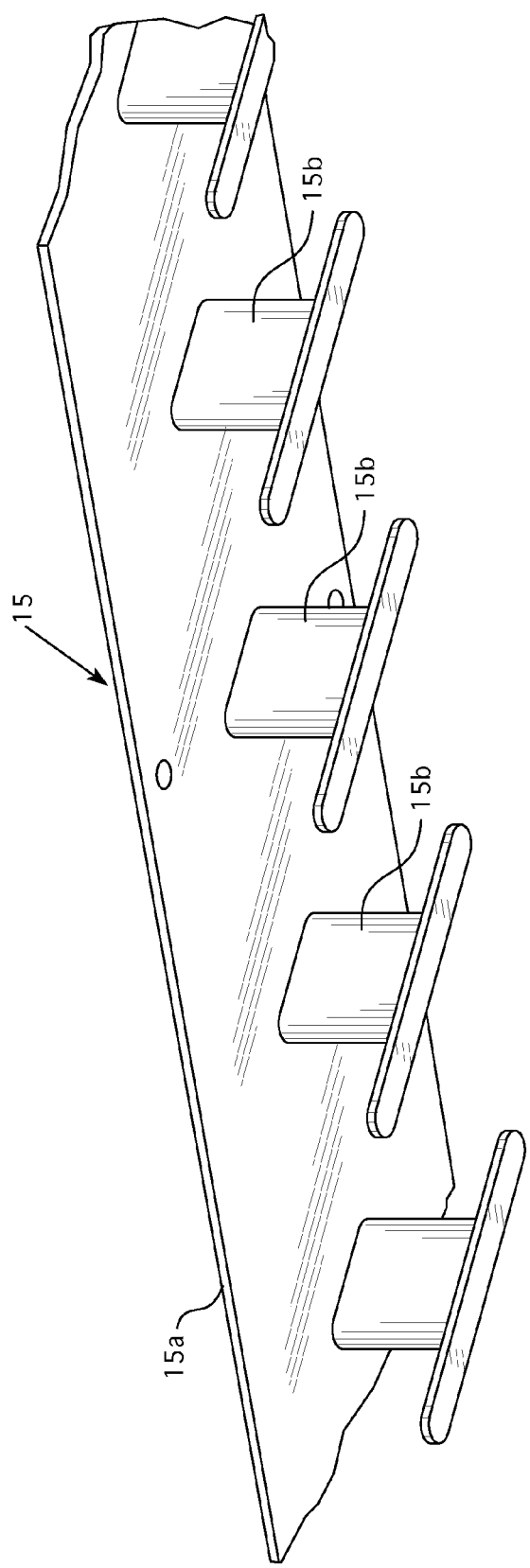
FIG. 2 is a perspective view of an exemplary embodiment of cleat portion of the first exemplary embodiment of the cord management system shown in FIG. 1 that is attachable to the bottom of a work surface such as a tabletop in an article of furniture.
Figure 3:
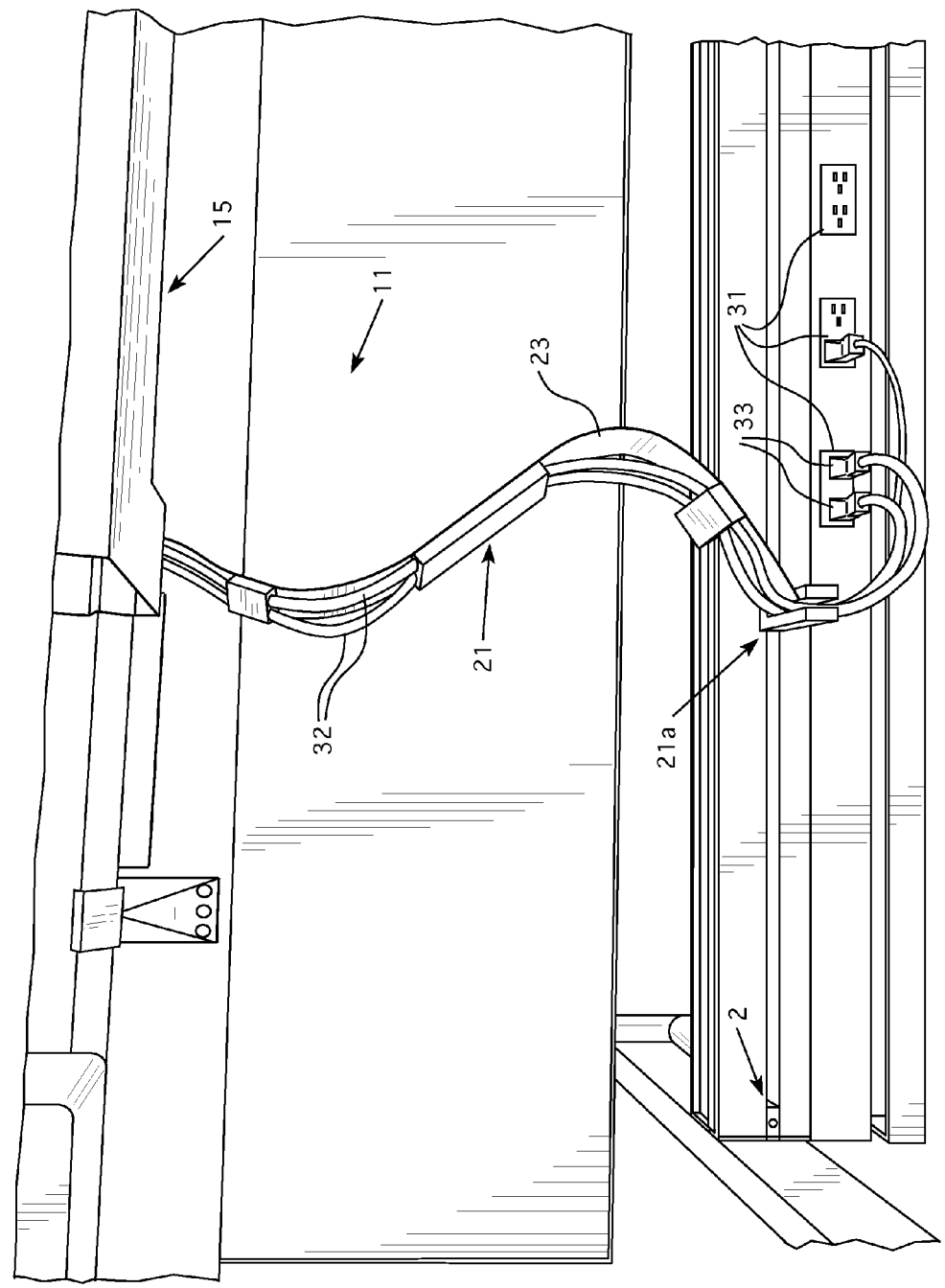
FIG. 3 is a perspective view of the first exemplary embodiment of the cord management system for an article of furniture attached to the first exemplary embodiment of the article of furniture that has its work surface moved to a raised position such that the elongated cord management assembly of the cord management system is in a first position which can be considered an extended position and/or an expanded position.
Figure 4:
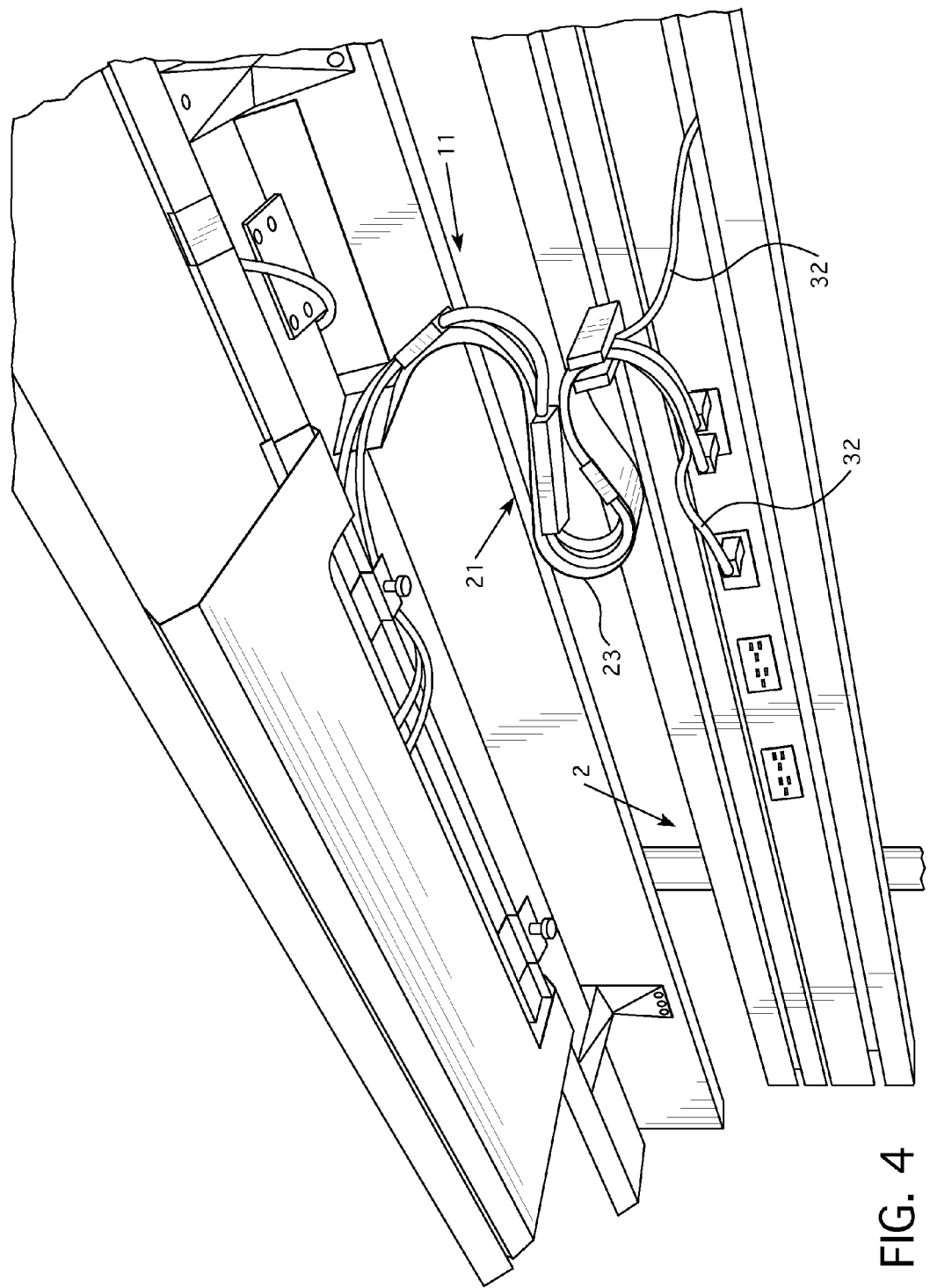
FIG. 4 is a perspective view of the first exemplary embodiment of the cord management system for an article of furniture attached to the first exemplary embodiment of the article of furniture that has its work surface moved to a lowered position such that the elongated cord management assembly of the cord management system is in a second position, which can be considered a compressed position in which portions of the elongated cord management assembly are more curved and a greater extent of different portions extend generally horizontally or laterally in parallel with each other at different vertical locations as compared to when the elongated cord management assembly is in its first position.
Figure 5:
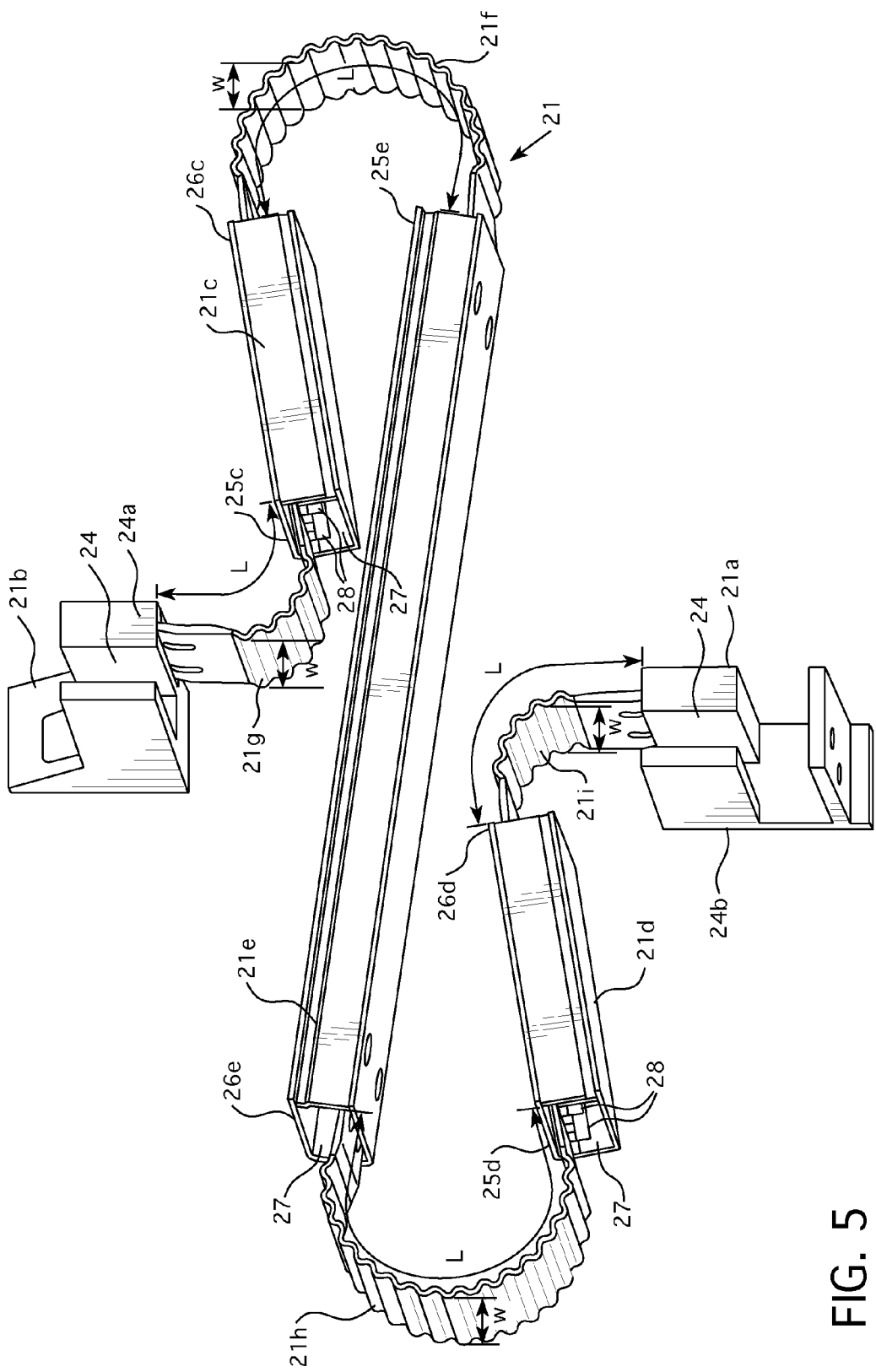
FIG. 5 is a perspective view of a first exemplary embodiment of the elongated cord management assembly of a cord management system in its second position.
Figure 6:
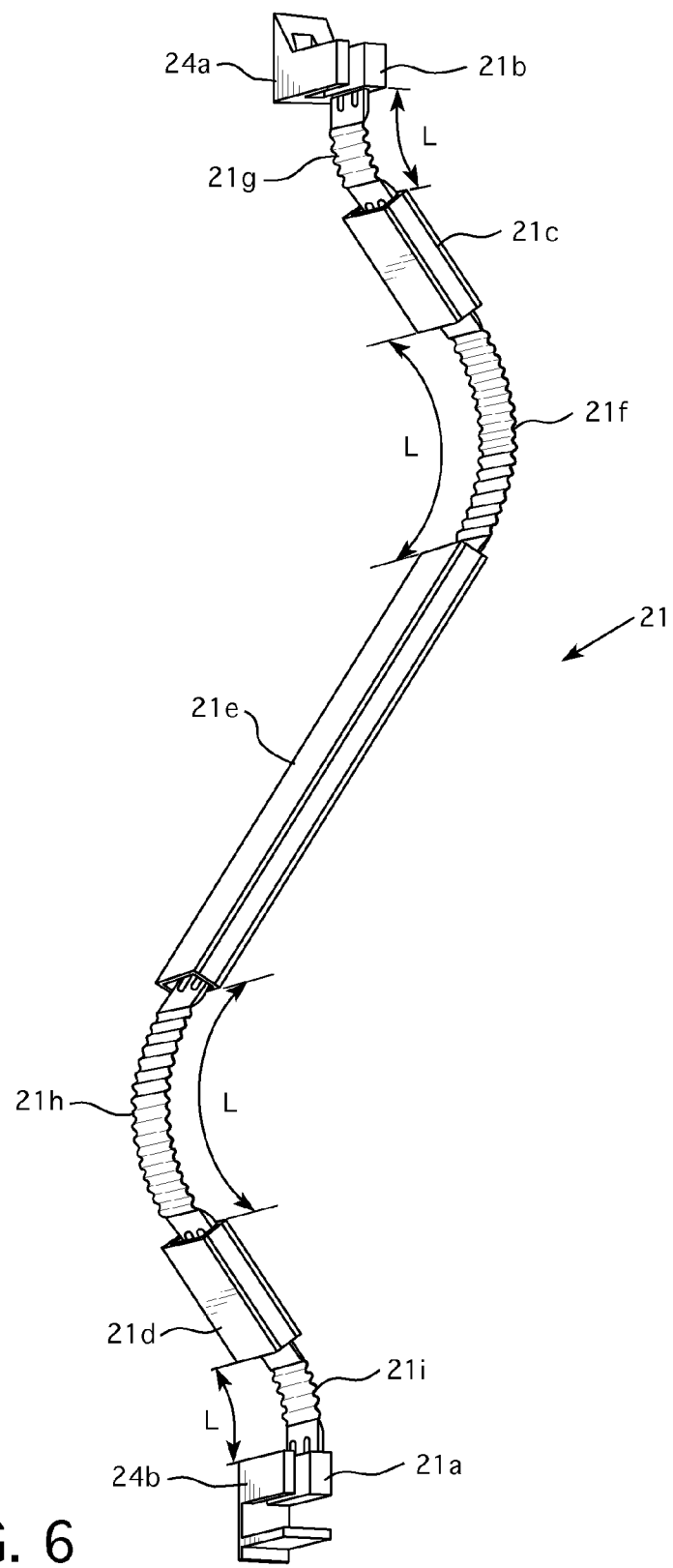
FIG. 6 is a perspective view of the first exemplary embodiment of the elongated cord management assembly of the cord management system in its first position.

Referring to FIGS. 1-6, an article of furniture 1 can include a cord management system 11. The article of furniture can be configured as a table, for example. Alternatively, the article of furniture can be configured as a counter. The article of furniture can have a base 2 that includes a plurality of legs 3 that support a work surface 4 such as an upper surface defined by a tabletop or countertop structure. The legs 3 can be configured to be extendable and retractable for raising and lowering the position of the work surface 4 to a plurality of different vertical positions. For example, each leg can be attached to an actuation mechanism such as a gas spring or hydraulic cylinder that can be actuatable to effect extension or retraction of one or more telescoping portions of the leg 3 for movement of the leg 3 from a retracted position to an extended position and vice versa for movement of the work surface 4 between a raised position and a lowered position as indicated in broken line in FIG. 1. An actuator attached to the actuator mechanism can be manipulated by a user to actuate movement of the legs 3 to adjust the work surface 4 to a desired vertical position within a range of positions provided by retraction and extension of legs 3. For instance, a button, switch, lever, handle, or other type of actuator may be connected to the leg retraction and extension mechanism for actuation of that mechanism to effect height adjustment of the work surface 4.

The legs 3 can be configured to attach to feet or can have feet for contacting a floor or can be attached to another portion of the base 2 that is configured for engagement with the floor. Alternatively, each leg can be attached to the same base structure or each leg can be attached to a respective base structure.

The work surface 4 can be a flat surface or can be configured to be inclined or declined. The work surface can be configured to have a polygonal shape, circular shape, round shape, or other type of shape having an outer perimeter that defines the outer boundary of the work surface. The structure 4 of the work surface can have a top surface 4a. The structure 4 defining the work surface (e.g. a tabletop or countertop) can have a bottom surface 4b and peripheral edges 4c as well. The peripheral edges 4c of the work surface can extend between the top and bottom surfaces of the structure 4 defining the work surface and define the outer perimeter of the work surface. The work surface can be formed of a composite material, wood, a polymeric material, metal, or other suitable material. For instance, the work surface 4 may be a tabletop formed of wood, metal, an alloy, a composite material, or a polymeric material.

A cord management system 11 can be attached to the article of furniture 1. The cord management system 11 can include a cleat assembly 15 that includes a plurality of cleats 15b attached to a plate 15a. The plate 15a can be fastened to the bottom surface 4b of the structure defining the work surface 4 (e.g. tabletop, countertop, etc.) by a plurality of fasteners or other type of fastening mechanism. The plate 15a can be a polymeric member, composite member, or metal member that has any of a number of suitable shapes such as a polygonal, circular or oval shaped member.

The cord management system 11 can also include an elongated cord management assembly 21 that is structured as an elongated flexible member having a plurality of spaced apart cable holders configured to retain cables such as power cords or other type of wiring or cables for electronic equipment (e.g. monitors, computers, printers, lights, lamps, electronic appliances, etc.). The cord management assembly 21 can include a first end 21a and a second end 21b opposite the first end 21a. Each end can be configured to include an attachment element for attachment to a component of the article of furniture. For instance the first end 21a can include a profile for interlocking with a mating profile defined on a portion of the article of furniture, such as a mating profile on a portion of the base 2 of an article of furniture or adjacent an outlet or data jack positioned in a wall or floor. As another example, the mating profile can be defined for interlocking on a bottom element of the bottom 4a of the work surface 4 positioned near the cleat assembly 15 or can be configured to interlock with or mate with a portion of the cleat assembly 15. When mating or interlocking with such a structure, the first end 21a can be configured to releaseably attach to that structure (e.g. article of furniture component or cleat assembly component or structure near an electrical outlet or data jack) so that a user can move the position of the first end 21a if so desired. The first end 21a can include a magnetic element or can include apertures for screws or bolts to provide an attachment or releaseable attachment to a particular structure (e.g. article of furniture component or cleat assembly component) to compliment and reinforce the mating and interlocking profile provided by the structure of that end. The mating profiles can include a jaw configuration on an end that is sized and configured for gripping and/or interlocking with a protuberance or other type of projection element of the article of furniture or cleat assembly 15. As another example, the mating profile can include a series of projections and apertures sized to interlock with and/or mate with a series of apertures and projections formed in an element of the article of furniture near the cleat assembly 15 or such a profile formed on a portion of the cleat assembly 15.

The second end 21*b* can include a profile that is the same as the profile of the first end 21*a*. It can alternatively include a different profile. For instance, the second end 21*b* can include a structure having a bracket structure for receiving one or more fasteners for affixing the second end 21*b* to a portion of the article of furniture (e.g. cleat assembly, bottom of work surface, a leg 3 or other portion of a base 2 of the article of furniture) or near an electrical outlet or data jack that is positioned on a bottom portion of the article of furniture or in an outlet or jack near a wall adjacent the bottom of the article of furniture. The second end 21*b* can include holes or slots sized for receiving fasteners for passing through the bracket portion for attachment of the second end to structure to which it is to be attached (e.g. work surface, portion of article of furniture, base 2 of article of furniture, a wall near at least one outlet 31 etc.).

The first and second ends 21*a* and 21*b* can each include a cord retaining portion 24. The first end 21*a* can include a cord retaining portion 24*b* of the first end 21*a* and the second end 21*b* can include a cord retaining portion 24*a* of the second end 21*b*. Each cord retaining portion can define a channel or other type of aperture through which cords 32 may pass. The walls of the cord retaining portion are configured to retain the cords to prevent the cords passing through the cord retaining portion from becoming disengaged from the cord retaining portion 24. For instance, each cord retaining portion 24 can contact or otherwise engage cords passing therethrough to bias the cords into engagement with the cord retaining portion to prevent the cords from moving out of engagement with the cord retaining portion 24.

The cord management assembly 21 can also include a middle portion between the first and second ends 21*a* and 21*b*. The middle portion can include one or more flexible elongated portions connected between different intermediately positioned cord holders or cord retaining portions. For example, the middle portion of the cord management assembly can include a first cord retention portion 21*c*, a second elongated cord retention portion 21*e* and a third cord retention portion 21*d*. The second elongated cord retention portion 21*e* can be longer than the first and third cord retention portions 21*c* and 21*d* and can be positioned between the first and third cord retention portions 21*c* and 21*d*. The first, second, and third cord retention portions 21*c*, 21*e* and 21*d* can each be positioned so that they are spaced apart from each other. The first cord retention portion 21*c* can be attached to the second end 21*b* by a first flexible and/or resilient elongated segment member 21*g* that extends between the second end 21*b* and a first side 25*c* of the first cord retention portion 21*c*. The second cord retention portion 21*e* can be flexibly and/or resiliently connected to the first cord retention portion 21*c* by a second elongated segment member 21*f* that extends form the first side 25*e* of the second cord retention portion 21*e* to the second side 26*c* of the first cord retention portion 21*c*. The third cord retention portion 21*d* can be flexibly and/or resiliently connected to the second cord retention portion 21*e* by a third elongated segment member 21*h* that extends from the first side 25*d* of the third cord retention portion 21*d* to the second side 26*e* of the second cord retention portion 21*e*. The third cord retention portion 21*d* can also be flexibly and/or resiliently connected to the first end 21*a* by a fourth elongated segment member 21*i* that extends between the second side 26*d* of the third cord retention member 21*d* and the first end 21*a*. The first sides 25*c*, 25*e*, and 25*d* of the first, second, and third cord retaining portions 21*c*, 21*e* and 21*d* can each be an end of that element and the second sides 26*c*, 26*e*, and 26*d*, of the first, second and third cord retaining portions can each be a second end of that element that is opposite its first side. In some embodiments, the different segment members that connect the different cord retaining portions may be separate elements and in other embodiments the segments may be portions of a unitary elongated member that is configured to be flexible such that the member is extendable into the first position shown in FIGS. 3 and 6 and compressible into the second position shown in FIGS. 4 and 5.

Each of the first, second, and third cord retention portions 21*c*, 21*e*, and 21*d* can be configured as a housing having a polygonal, rounded, or other type of structure that defines an inner channel 27 or cavity that extends from the first side 25*c*, 25*e*, 25*d* to the second side 26*c*, 26*e*, 26*d* of the cord retention portion. The inner channels 27 define passageways for portions of power cords or other wiring to pass through. The external structure of each cord retention portion defining its channel 27 helps retain the cords passing therethrough and helps keep those cords engaged to or retained by the cord management assembly 21. Each structure of the first, second, and third cord retention portions 21*c*, 21*e*, and 21*d* can also include inner walls or guides to help collect cords passing through the channels 27 so that the cords are kept in a desired alignment or configuration. For instance, there may be multiple spaced apart inner walls 28 positioned within the channel 27 to define separate passageways for respective cords passing through the channels 27. The inner walls 28 can be configured as projections, protuberances, spines or other elements that may extend into the channels 27 so that certain cords may be separated from other cords passing through the channels 27.

Each elongated segment member 21*g*, 21*f*, 21*h*, and 21*i* can be configured as an elongated strap that has a plurality of ridges, furrows, and/or grooves extending along the width of the strap, where the width W of each segment member extends in a direction that is perpendicular to the length L of those segments that extend between different cord retaining portions or a cord retaining portion and an end of the cord management assembly 21. Each elongated strap can be composed of an elastomeric or polymeric material and be configured to resiliently or flexible bend from a coiled, curved, compressed position to a less bent or less curved extended position when the cord management assembly 21 is moved from a compressed position to an extended, more elongated position when the work surface 4 is raised from a lowered position to a raised position. The elongated segment members 21*g*, 21*f*, 21*h*, and 21*i* can each also be configured to bend or curve from the extended elongated position back into the compressed position when the work surface 4 is lowered from a raised position to a lowered position.

In some embodiments, the thickness of some of the elongated segment members 21*g*, 21*f*, 21*h*, and 21*i* can differ from the thickness of other elongated segment members. For instance, in some embodiments, the first elongated segment member 21*g* and fourth elongated segment member 21*i* can be configured to have a greater thickness than the second and third elongated segment members 21*f* and 21*h*. The greater thickness at these outer elongated segment members can allow those segment members to better resist changes in shape and/or resiliency that could be imposed on those segment members by gravity and/or the weight of the cords when the cord management assembly 21 is in use. Such greater thickness in these elements can also provide a more desired aesthetic effect in the cord management assembly 21 that may be provided when it is adjusted from the first position to the second position and vice versa.

In other embodiments, it is contemplated that other elongated segment members may have different thicknesses. For instance, it is contemplated that the second and fourth elongated segment members 21f and 21i can have the same thickness that is greater or less than the thickness of the first elongated segment member 21g and/or the third elongated segment member 21h.

The cord management assembly 21 is configured so that it can be moved from its first position to its second position and vice versa. When a work surface is in a raised position, the cord management assembly 21 may be structured to extend in such a way when in its second extended position such that the extended shape resembles a "S" type shape, "ʃ" type shape, backward "ʃ" in shape, (e.g. "ㄥ" in shape) or a backward "S" in shape, (e.g. " ᘔ " in shape). When the work surface 4 is in the lowered position, the cord management assembly 21 can be compressed to its first position, which may be a curved compressed configuration that is generally "" in shape and/or is or generally "  ", or generally "  " in shape.

In some embodiments, it is contemplated that the elongated segment members 21g, 21f, 21h, and 21i may be portions of a unitary polymeric or elastomeric element 23 that extends from the first end 21a to the second end 21b and passes along and is attached to an outer side of each cord retention portion 24a, 21c, 21e, 21d, and 24b. The elongated segment member may be transparent in color (e.g. clear) so that a user can see through the segment member to visually see the cords or may be opaque in color (e.g. red. blue, black, etc.).

The one or more elongated segment members can define a path about which the cords 32 extend along as they extend from plugs 33 positioned in at least one outlet 31 or other power distribution device near the first end 21a to the second end 21b of the cord management assembly 21. Portions of the cords can contact the elongated segment members such that the elongated segment members help hold the cords in a retained position adjacent the cord retention portions and/or help bias the cords to the shape of the cord management assembly 21 when the work surface is raised and/or lowered such that the portion of cords passing through the cord management assembly has a corresponding shape to the shape of the cord management assembly 21 when the work surface is raised or lowered (e.g. has a corresponding "S' type shape, "ʃ" type shape, backward "ʃ" shape, (e.g. "ㄥ" in shape) or a backward "S" type shape, (e.g. " ᘔ " in shape) when the work surface 4 is in the raised position the cord management assembly 21 is in an extended second position and the cords have a generally "" shape and/or is generally "  " shape or generally "  " when the work surface 4 is in the lowered position and the cord management assembly 21 is in the more extensively curved, compressed first position). The cords may extend out of the first end 21a and be wrapped around one or more cleats of the cleat assembly 15 prior to having a terminal end of the cord connected to an outlet in the work surface 4, an outlet in the article of furniture adjacent the work surface 4, or in a plug or other type of receptacle of an electronic appliance.

The cord management assembly 21 can be configured so that a plurality of power cords, wiring, or other type of cables, wiring elements, or other type of cords can extend from an outlet to an outlet positioned in the work surface 4 and/or to an electronic appliance positioned on, in, or otherwise adjacent to the work surface 4. The cabling or wiring passing through the cord management assembly can include Ethernet or other type of network communication wiring that may extend from an outlet, router, or other type of communication device as well. The inner walls 28 can be configured to provide special separation between data cables and any power cables managed within any inner channels 27 defined by elements of the cord management assembly 21.

For example, cords 32 can each have a first plug or receptacle at a first terminal end for connecting to an electronic device positioned on, in or under a work surface (e.g. a light, a computer, a power distribution mechanism, a communication data distribution mechanism, etc.), have a first intermediate portion routed around one or more of the cleats to accommodate the length of each cord, have a second intermediate section pass through the second end 21b, have a third intermediate section pass out of the first end 21a and have a second plug or receptacle at a second terminal end that is at an outlet or jack positioned on the base of the article of furniture or at a nearby location in a building, such as a wall receptacle or a floor receptacle. The wrapping of the first intermediate portion of the cord along one or more of the cleats can be configured to allow for sufficient length of the cord 32 to be managed via the cord management assembly 21 from adjacent the cleat assembly to an electrical outlet or data network jack to which that cord may be connected. The second and third intermediate portions of the cords 32 can pass through inner channels 27 and be separated from each other via inner walls 28. For instance, power cords that pass through the cord management assembly 21 can be separated from data cables via the inner walls 28 when those cords 32 are passed through the cord management assembly 21.

It should be appreciated that embodiments of the cord management system and furniture having such a system can be configured differently. For instance, the shape and size of the work surface 4 can be any of a number of different shapes and sizes. The work surface 4 can be defined by one unitary structure (e.g. a tabletop or countertop formed of one unitary piece of stone, wood, composite material, polymeric material, or metal) or by interconnected structures fastened or otherwise joined together (e.g. a tabletop or countertop that is comprised of two or more interconnected pieces where each piece is connected to at least one other piece by a fastening mechanism such as adhesive, welding, fasteners, or other type of fastening apparatus). As another example, when being adjusted between compressed and extended positions, the length of different segments may be the same and simply be less curved or compressed for some embodiments and in other alternative embodiments, at least some of the segments may be sufficiently resilient to also stretch when moving from the compressed position to the extended position such that lengths of those segments at least slightly increase. As another example, each element of the article of furniture and cable management system can be composed of any type of material that can help meet a particular design objective such as a metal, an elastomeric material, a polymeric material, or be composed of a combination of such materials due to the interconnection of different structures formed of different types of materials to form that element.

Therefore, it should be understood that while certain exemplary embodiments of articles of furniture and cable management mechanisms for furniture and methods of making and using the same have been discussed and illustrated herein, it is to be distinctly understood that the invention is not limited thereto but may be otherwise variously embodied and practiced within the scope of the following claims.

What is claimed is:

1. An article of furniture comprising:
    a work surface;
    a base that supports the work surface, the base being vertically adjustable to raise and lower the work surface between a raised position and a lowered position; and
    a cord management system positioned between the work surface and the base, the cord management system comprising:
        a cord management assembly having a first end, a second end, and a middle portion between the first and second ends, the first end positioned adjacent a bottom surface of a structure defining the work surface, the second end positioned adjacent the base, the middle portion extending from adjacent the first end to adjacent the second end, the middle portion having at least one cord retention portion attached to at least one flexible elongated segment member, and
        the cord management assembly configured such that the cord management assembly is in a curved compressed first position when the work surface is in the lowered position and is in an extended second position that is less curved and less compressed than the curved compressed first position when the work surface is in the raised position such that the middle portion extends horizontally to a greater extent when the cord management is in the curved compressed first position as compared to when the cord management assembly is in the extended second position.

2. The article of furniture of claim 1 wherein the at least one flexible elongated segment member is a unitary member extending from the first end to the second end of the cord management assembly.

3. The article of furniture of claim 1 wherein the at least one cord retention portion is comprised of a first cord retention portion, a second cord retention portion and a third cord retention portion and the at least one flexible elongated segment member comprises a first flexible elongated segment member, a second flexible elongated segment member, a third flexible elongated segment member, and a fourth flexible elongated segment member.

4. The article of furniture of claim 3 wherein the first cord retention portion is attached to the first end by the first flexible elongated segment member extending between the first end and the first cord retention portion, the second cord retention portion is attached to the first cord retention portion by the second flexible elongated segment member extending between the first and second cord retention portions, the third cord retention portion is attached to the second cord retention portion by the third flexible elongated segment member extending between the second and third cord retention portions, and the second end is attached to the third cord retention portion by the fourth flexible elongated segment member extending between the third cord retention portion and the second end.

5. The article of furniture of claim 4 wherein the first end has a cord retention portion and the second end has a cord retention portion.

6. The article of furniture of claim 5 wherein the first end has a profile for interlocking with a portion of the structure defining the work surface or a first portion of the article of furniture and the second end has a profile for interlocking with a portion of the base of the article of furniture or a second portion of the article of furniture.

7. The article of furniture of claim 4 wherein the second cord retention portion is longer than the first cord retention portion and the second cord retention portion is also longer than the third cord retention portion.

8. The article of furniture of claim 4 wherein the first, second and third cord retention portions each defines a channel through which a plurality of cords pass as the cords extend from an outlet to a position adjacent the work surface.

9. The article of furniture of claim 8 wherein each of the flexible elongated segment members are configured to bias external portions of the cords that are outside of the channels of the first, second, and third cord retention portions such that the cords are biased to have a shape corresponding to a shape of the cord management assembly when the work surface is moved from the lowered position to the raised position and wherein the first, second and third cord retention portions are spaced apart from each other.

10. The article of furniture of claim 9 wherein the shape of the cord management assembly is generally an "S' shape, ""ι" shape, "ʃ" shape, or a " ᘔ " shape when the work surface is in the raised position and is in a generally "" shape when the work surface is in the lowered position.

11. The article of furniture of claim 1 wherein each cord retention portion defines a channel through which cords pass and have a plurality of spaced apart walls positioned in the channel to define passageways for different cords passing through the channel.

12. The article of furniture of claim 1 wherein each flexible elongated segment member has a width and a length and has a plurality of furrows, grooves, or ridges that extend along the width.

13. The article of furniture of claim 1 wherein the base is comprised of retractable and extendable legs that are moved to adjust the position of the work surface between the raised and lowered positions.

14. The article of furniture of claim 1 wherein the article of furniture is a table or a counter.

15. The article of furniture of claim 1 wherein the cord management system is also comprised of a cleat assembly positioned adjacent to the bottom surface of the structure defining the work surface;
    wherein the cleat assembly is comprised of a plurality of spaced apart cleats attached to a plate member configured to be attached to the bottom surface of the structure defining the work surface.

16. A cord management system for an article of furniture comprising:
    a cord management assembly having a first end, a second end, and a middle portion between the first and second ends, the first end positionable adjacent a bottom surface of a structure defining a work surface, the second end positionable adjacent a base that supports the work surface, the middle portion extending from adjacent the first end to adjacent the second end, the middle portion having at least one cord retention portion attached to at least one flexible elongated segment member, and
    the cord management assembly configured such that the cord management assembly is moveable between a curved compressed first position and an extended second position that is less curved than the curved compressed first position such that at least a segment of the middle portion extends horizontally to a greater extent when the cord management assembly is in the compressed first position as compared to when the cord management assembly is in the extended second position.

17. The cord management system of claim 16 wherein the at least one cord retention portion is comprised of a first cord retention portion, a second cord retention portion and a third cord retention portion and the at least one flexible elongated segment member is comprised of a first flexible elongated segment member, a second flexible elongated segment member, a third flexible elongated segment member, and a fourth flexible elongated segment member;

wherein the first cord retention portion is attached to the first end by the first flexible elongated segment member extending between the first end and the first cord retention portion, the second cord retention portion is attached to the first cord retention portion by the second flexible elongated segment member extending between the first and second cord retention portions, the third cord retention portion is attached to the second cord retention portion by the third flexible elongated segment member extending between the second and third cord retention portions, and the second end is attached to the third cord retention portion by the fourth flexible elongated segment member extending between the third cord retention portion and the second end; and the first cord retention portion being spaced apart from the second cord retention portion, the second cord retention portion being spaced apart from the third cord retention portion, and the third cord retention portion being spaced apart from the first cord retention portion.

18. The cord management system of claim 17 wherein the second cord retention portion extends generally horizontally to a greater extent when the cord management assembly is in the compressed first position as compared to when the cord management assembly is in the extended second position; and wherein the second cord retention portion is longer than the first cord retention portion and the second cord retention portion is also longer than the third cord retention portion.

19. The cord management system of claim 18 wherein the first, second and third cord retention portions each defines a channel through which a plurality of cords pass as the cords extend from an outlet to a position adjacent the work surface; and wherein each of the flexible elongated segment members are configured to bias external portions of the cords that are outside of the channels of the first, second, and third cord retention portions such that the cords are biased to have a shape corresponding to a shape of the cord management assembly when the work surface is moved from the lowered position to the raised position.

20. A cord management system for an article of furniture comprising:

a cord management assembly having a first end, a second end, and a middle portion between the first and second ends, the first end positionable adjacent a bottom surface of a structure defining a work surface, the second end positionable adjacent a base that supports the work surface, the middle portion extending from adjacent the first end to adjacent the second end, the middle portion having at least one cord retention portion attached to at least one flexible elongated segment member, and the cord management assembly configured such that the cord management assembly is moveable between a curved compressed first position and an extended second position that is less curved than the curved compressed first position;

wherein the at least one cord retention portion is comprised of a first cord retention portion, a second cord retention portion and a third cord retention portion and the at least one flexible elongated segment member is comprised of a first flexible elongated segment member, a second flexible elongated segment member, a third flexible elongated segment member, and a fourth flexible elongated segment member;

wherein the first cord retention portion is attached to the first end by the first flexible elongated segment member extending between the first end and the first cord retention portion, the second cord retention portion is attached to the first cord retention portion by the second flexible elongated segment member extending between the first and second cord retention portions, the third cord retention portion is attached to the second cord retention portion by the third flexible elongated segment member extending between the second and third cord retention portions, and the second end is attached to the third cord retention portion by the fourth flexible elongated segment member extending between the third cord retention portion and the second end;

the first cord retention portion being spaced apart from the second cord retention portion, the second cord retention portion being spaced apart from the third cord retention portion, and the third cord retention portion being spaced apart from the first cord retention portion;

the second cord retention portion being longer than the first cord retention portion and the second cord retention portion being longer than the third cord retention portion;

wherein the first, second and third cord retention portions each defines a channel through which a plurality of cords pass as the cords extend from an outlet to a position adjacent the work surface; and wherein each of the flexible elongated segment members are configured to bias external portions of the cords that are outside of the channels of the first, second, and third cord retention portions such that the cords are biased to have a shape corresponding to a shape of the cord management assembly when the work surface is moved from the lowered position to the raised position; and wherein the shape of the cord management assembly is generally an "S" shape, a "ใ" shape, a "ʃ" shape, or a " ᘔ " shape when the cord management assembly is in the second position and is in a generally "" shape when the cord management assembly is in the first position.

* * * * *